Nov. 22, 1932.   H. M. LAXER   1,888,861
APPARATUS FOR PRODUCING MOVING PICTURE EFFECTS
Filed July 18, 1931
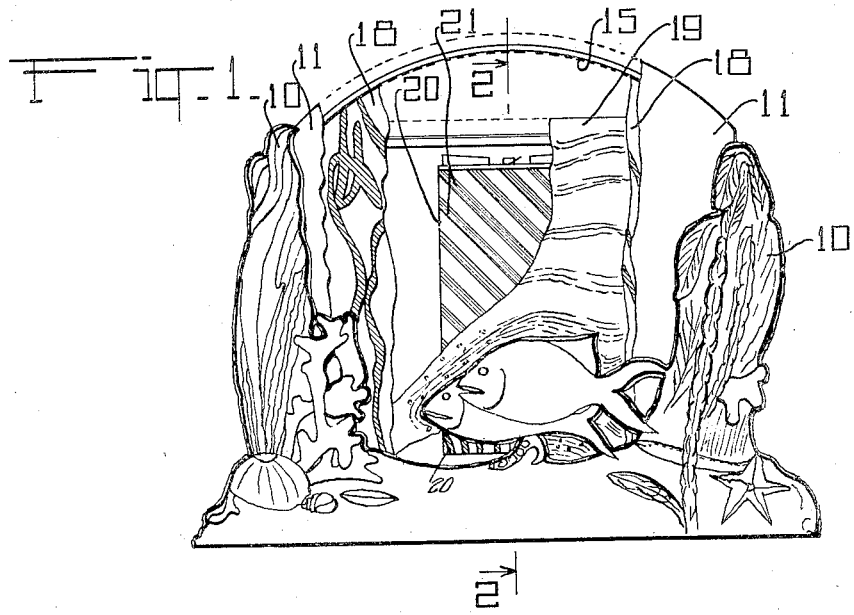
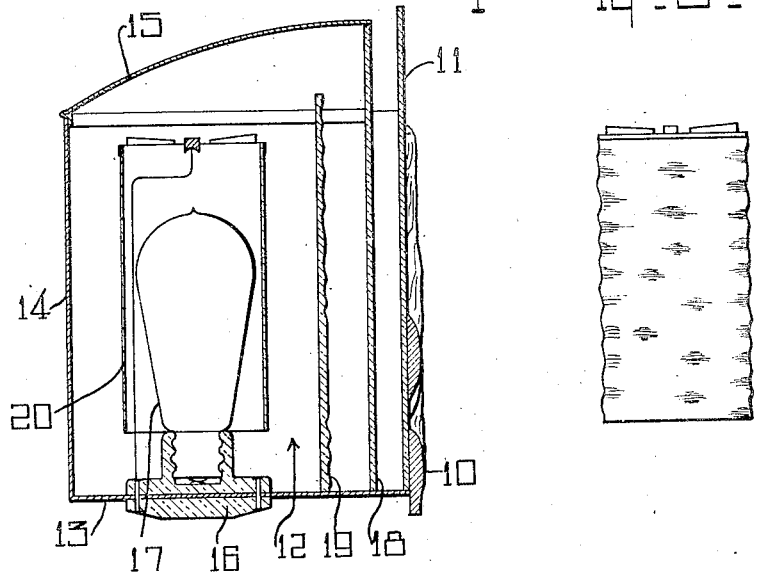
INVENTOR
Harry M. Laxer
BY
Starfield, Fraser & Brown
ATTORNEY Patented Nov. 22, 1932

1,888,861

UNITED STATES PATENT OFFICE

HARRY M. LAXER, OF NEW YORK, N. Y., ASSIGNOR TO MARVELITE PRODUCTS CORPORATION, OF NEW YORK, N. Y., A CORPORATION OF NEW YORK

APPARATUS FOR PRODUCING MOVING PICTURE EFFECTS

Application filed July 18, 1931. Serial No. 551,586.

This invention relates to a method and apparatus for throwing varying light effects upon a screen, and more particularly to a display device wherein varying shadows and lights form a changing background for a stationary design.

An object of the invention is to provide a method and apparatus therefor for simulating moving effects upon a screen, which is simply carried out, economical of execution, easily reproduced, and which may be performed in a small area and which will efficiently accomplish the results which it is wished to obtain.

Another object is to provide apparatus wherein condensed and/or dispersed light rays are caused to flicker on a screen so as to give the impression of motion alone or in combination with similarly flickering shadows or stationary designs, or both.

A further object is to provide apparatus wherein a scene is presented which appears to have natural objects partaking of natural motion due to the optical illusion produced by a background variously illuminated.

A still further object is to provide a simple multiple lens for condensing and/or dispersing shifting light rays to bring out high lights and tones in a changing or stationary screen picture.

Other objects of the invention will in part be obvious and will in part appear hereinafter.

The invention accordingly comprises the several steps and the relation and order of one or more of such steps with respect to each of the others, and the apparatus embodying features of construction, combinations of elements and arrangement of parts which are adapted to effect such steps, all as exemplified in the following detailed disclosure, and the scope of the application of which will be indicated in the claims.

For a fuller understanding of the nature and objects of the invention reference should be had to the following detailed description taken in connection with the accompanying drawing, in which:

Fig. 1 is a front view, in elevation, partly in section, of one form of apparatus embodying the invention;

Fig. 2 is a side view in section of the apparatus shown in Fig. 1, taken along the line 2—2; and Fig. 3 is a view in elevation of a modification of the revolving screen shown in Fig. 1.

This invention falls within that class of devices which give an apparent motion to stationary objects by means of a continuously changing background. The background is thrown from the rear upon a translucent field and comprises varying light forms or pictures. The change in form is due to several factors. One relatively stable part of the background is a series of high lights produced by a lens member placed between the field and a light source. Since this source is not a point, the edges of the condensed rays, as well as any dispersed rays, are not sharply defined. A screen having certain opaque portions revolves around the light source and cuts off from time to time some of the rays from the source with the result that the edges of the high lights on the field are displaced and the high lights and shadows actually shift. In the present instance the lens system is a glass plate, one surface being corrugated. Each of the adjacent rays in a broad beam passing through a corrugation is condensed upon itself, the entire beam is narrowed and intensified and its intersection with the field gives a linear high light. The various corrugations are so arranged as to give any desired configuration of high lights on the field. Another relatively stable part of the background is the shadow of some opaque design which is placed between the field and the light source. Here again the shadow actually moves. This shadow design may be adapted to conform in general plan with the stationary object. The shadow design and the high light design may intermingle.

One portion of the background on the field has a large motion. This portion, appearing at one edge, sweeping across the field and disappearing at another edge, comprises those shadows cast by the opaque design on the revolving screen. Such a design may be a series of stripes, various portions of which have varying inclinations from the vertical. The arrangement of these portions permits of the sweeping shadows flowing about the stationary design to form a more complete picture.

In the exemplification of the invention shown in the drawing, 10 is an opaque screen of any suitable material, such as metal, certain parts of which may be in relief and certain parts cut away. The screen may represent a scene in nature, for example, a marine setting, part being cut away to outline swimming fishes. The base of the screen 10 acts as one support for the entire device. Positioned immediately to the rear of the screen 10 is a translucent field 11 which may be a sheet of glass, ground or with a thin coating of pigment on one side. Behind the screen 10 and attached thereto is a receptacle 12 having a floor 13, and a surrounding side wall 14 which may be generally arcuate. The field 11 may be considered the front wall of the receptacle. A dome-like top 15 is adapted to set on the wall 14. A base 16 for an electric light bulb 17 or other suitable light source, extends through the rear of the floor 13 and may act as the other support for the entire device.

Spaced to the rear of the field 11 and within the receptacle 12 is an element 18 having opaque areas. In the form shown, this comprises a transparent glass partially covered by opaque pigment in the shape of marine flora. This may also take the form of an opaque screen having interstices.

A transparent screen 19 of suitable material, such as glass, is also spaced to the rear of field 11, either in front or in back of the element 18. The screen 19 is adapted to condense and/or disperse certain light rays falling thereon from the bulb 17. This may be accomplished by any suitable lens system, for example, by a corrugated surface which may be integral with the screen.

Suspended over the bulb 17 is a rotatable cylinder 20 closed at the top and having certain opaque portions 21 and certain transparent portions. The transparent portions may be cut out of an opaque cylinder or a transparent cylinder, e. g., glass, may have portions made opaque as by the application of pigment. The top is provided with vents and vanes which cause the cylinder to rotate when warm air rises from the bulb 17. As shown, the opaque portions incline from the vertical near the top and approach the vertical at the bottom of the rotating cylinder. With vanes similarly inclined the shadows of the portions 21 cast on the field 11 seem to rise in the upper part of the field (above the fish) and to flow along the bottom of the field (below the fish). This direction of motion is variable with the form of the opaque portions 21 and may be changed to fit the screen represented.

The element 18 may be omitted and the opaque portions thereof superimposed on the screen 19.

In operation, the light from the bulb 17 passes through the screen 19 which acts like a system of lenses to form a predetermined image on the field. In the present instance, the image represents foam, bubbles and water eddies swirling away from the fish. The design of these high lights give this impression even without the rotating screen which may be dispensed with as far as this aspect of the background is concerned. Some of the light is cut off by the element 18, leaving corresponding shadows on the field 11 (seaweed, for example). As the rotatable screen moves, both the high lights and the deep shadows have a wavering motion as explained above. Furthermore, the shadows due to the opaque portions 21 sweep across the field.

With a device as described, it is possible to obtain not merely simple, flickering areas of generally uniform intensity against a dark background, but rather to build up a picture of lights and darks and intermediate tones. It is possible not merely to suggest motion, but also by the present invention actually to create the gradations in tone found in nature, and to distribute them as they are in reality.

In the modification of the rotatable screen as shown in Fig. 3, the surface of the rotatable screen acts as a plurality of lenses. Integral corrugations and irregularities may be formed on the surface in any desired pattern or design to condense and/or disperse the light and so give high lights of various intensities on various parts of the field. With such a cylinder complete gradations in tone may be caused to sweep various portions of the field with various paths. There is no loss of illumination as the entire amount of light incident upon the rotatable cylinder is transmitted to the field. It is also possible to super-impose an opaque design upon the screen.

Since certain changes in carrying out the above process and in the constructions set forth, which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In apparatus of the character described, the combination comprising a translucent field, means for condensing certain light rays and scattering certain other light rays onto said field in a predetermined pictorial design, said means being spaced a distance behind said field, and means for cutting off certain light rays at certain times, said condensing and scattering means being provided with surface irregularities which form a pictorial design.

2. In apparatus of the character described, the combination comprising a translucent field, means for condensing certain light rays and scattering certain other light rays onto said field in a predetermined pictorial design, said means being spaced a distance behind said field and comprising a translucent screen, and means for cutting off certain light rays at certain times, said condensing and scattering means being provided with surface irregularities which form a pictorial design.

3. In apparatus of the character described, the combination comprising a translucent field, means for condensing certain light rays and scattering certain other light rays onto said field in a predetermined pictorial design, said means being spaced a distance behind said field and comprising a translucent screen having at least one uneven surface, and means for cutting off certain light rays at certain times, said condensing and scattering means being provided with surface irregularities which form a pictorial design.

4. In apparatus of the character described, the combination comprising a translucent field, means for condensing certain light rays and scattering certain other light rays, the ends of said rays being adjacent along a predetermined pictorial design in a transverse plane, and means for successively cutting off certain light rays, the ends of said last rays being adjacent along predetermined lines, said first mentioned means comprising a translucent screen spaced between said field and said second mentioned means, said condensing and scattering means being provided with surface irregularities which form a pictorial design.

5. In apparatus of the character described, the combination comprising a translucent field, an element presenting an opaque pictorial design spaced a distance behind said field, means for condensing certain light rays and scattering certain other light rays onto said field in a predetermined pictorial design, said means being spaced a distance behind said field, and means for cutting off certain light rays at certain times, said condensing and scattering means being provided with surface irregularities which form a pictorial design.

6. In apparatus of the character described the combination comprising a translucent field, an element presenting an opaque pictorial design spaced a distance behind said field, means for refracting light rays and spaced a distance behind said field and means for cutting off certain light rays at certain times, said refracting means being provided with surface irregularities which form a pictorial design.

7. In apparatus of the character described, the combination comprising a translucent field, an element presenting an opaque design against a transparent or translucent surface spaced a distance behind said field, means for condensing certain light rays and scattering certain other light rays onto said field in a predetermined pictorial design, said means being spaced a distance behind said field, and means for cutting off certain light rays at certain times, said condensing and scattering means being provided with surface irregularities which form a pictorial design.

8. In apparatus of the character described, the combination comprising a translucent field, an element presenting an opaque design against a transparent or translucent surface spaced a distance behind said field, means adapted for condensing certain light rays and scattering certain other light rays onto said field in a predetermined pictorial design, said means being spaced a distance behind said element, and means for cutting off certain light rays at certain times, said condensing and scattering means being provided with surface irregularities which form a pictorial design.

9. In apparatus of the character described, the combination comprising a translucent field, an opaque pictorial design positioned in front of said field, means for condensing certain light rays and scattering certain other light rays, the ends of said rays forming a second pictorial design on said field in conjunction with said opaque design, and means for successively cutting off certain rays, the ends of said rays also forming a design on said field, and said condensing and scattering means being provided with surface irregularities which form a pictorial design.

10. In apparatus of the character described, the combination comprising a translucent field, an opaque design positioned in front of said field, an element having an opaque design spaced a distance behind said field, means behind said field for condensing certain light rays and scattering certain other light rays, the ends of said rays forming a second design on said field in conjunction with said first mentioned opaque design, a source of light rays, and means for successively cutting off certain rays, the ends of said rays also forming a design on said field whereby the shadow of said element cast upon said condensed and said scattered rays impinging upon said field are caused to waver.

11. In apparatus of the character described the combination comprising a translucent field, an opaque design positioned in front of said field, an element having an opaque design spaced a distance behind said field, means behind said field for refracting light rays, the ends of said rays forming a second design on said field in conjunction with said first-mentioned opaque design, and means for successively cutting off certain rays, the ends of said last-mentioned rays also forming a design on said field, whereby the shadow of said element cast upon said refracted rays impinging upon said field are caused to waver.

12. In apparatus of the character described, the combination comprising a translucent field, an opaque design positioned in front of said field, an element having an opaque design spaced a distance behind said field, means behind said field for condensing certain light rays and scattering certain other light rays, the ends of said rays forming a second design on said field in conjunction with said first mentioned opaque design, said means comprising a translucent screen having at least one uneven surface, a source of light rays, and means for successively cutting off certain rays, the ends of said rays also forming a design on said field whereby the shadow of said element cast upon said condensed and said scattered rays impinging upon said field are caused to waver.

13. In apparatus of the character described, the combination comprising a translucent field, an opaque design positioned in front of said field, an element having an opaque design spaced a distance behind said field, means behind said field for condensing certain light rays and scattering certain other light rays, the ends of said rays forming a second design on said field in conjunction with said first mentioned opaque design, said means comprising a translucent screen having at least one uneven surface, a source of light rays, and means for successively cutting off certain rays, the ends of said rays also forming a design on said field whereby the shadow of said element cast upon said condensed and said scattered rays impinging upon said field are caused to waver, said last mentioned means comprising a transparent cylinder having an opaque design thereon.

14. In apparatus of the character described, the combination comprising a translucent field, an opaque design positioned in front of said field, an element having an opaque design spaced a distance behind said field, means behind said field for condensing certain light rays and scattering certain other light rays, the ends of said rays forming a second design on said field in conjunction with said first mentioned opaque design, a source of light rays, and means for successively cutting off certain rays, the ends of said rays also forming a design on said field whereby the shadow of said element cast upon said condensed and said scattered rays impinging upon said field are caused to waver, said last mentioned means comprising a transparent cylinder having an opaque design thereon, and means for rotating said cylinder about said light source.

15. In apparatus of the character described, in combination, the following elements spaced in the following order, a metallic design, a translucent field, a transparent screen bearing an opaque design, a transparent screen at least one surface of which is uneven, a rotatable transparent screen having an opaque design, and a light source within said rotatable screen, said designs being related.

16. In apparatus of the character described, the combination comprising a translucent field, and means adapted for cutting off the light rays in certain directions at certain times and for condensing certain light rays and scattering yet other light rays in a composite pictorial design at said times and adapted at other times for condensing and scattering said first mentioned rays as a continuation of said pictorial design, said condensing and scattering means being provided with surface irregularities which form a pictorial design.

17. In apparatus of the character described, the combination comprising a translucent field, an element presenting an opaque design spaced a distance behind said field, means for condensing certain light rays and scattering certain other light rays, said means being spaced a distance behind said field and comprising a translucent screen and means for cutting off the light rays in certain directions at certain times.

18. In apparatus of the character described the combination comprising a translucent field, an element presenting an opaque design spaced a distance behind said field, means for refracting certain light rays, said means being spaced a distance behind said field and comprising a translucent screen, and means for cutting off the light rays in certain directions at certain times.

19. In apparatus of the character described, the combination comprising a translucent field, means for successively condensing certain light rays and scattering certain other light rays, the ends of said rays being adjacent along predetermined lines of a design in a transverse plane, and means for supplying light rays, said condensing and scattering means being provided with surface irregularities which form a pictorial design.

20. In apparatus of the character described, the combination comprising a translucent field, means for successively condensing certain light rays and scattering certain other light rays, the ends of said rays being adjacent along predetermined lines in a transverse plane, and means for successively cutting off certain light rays, the ends of said last rays being adjacent along predetermined lines in a transverse plane, and said condensing and scattering means being provided with surface irregularities which form a pictorial design.

21. In apparatus of the character described, the combination comprising a translucent field, an opaque design positioned in front of said field, means for successively condensing certain light rays and scattering certain other light rays, the ends of said rays forming a second design on said field in conjunction with said opaque design, and means for successively cutting off certain rays, the ends of said last rays also forming a design on said field, and said condensing and scattering means being provided with surface irregularities which form a pictorial design.

22. A method for simulating motion on a translucent field, comprising setting up opaque pictorial areas in front of said field, condensing light rays onto said field in a pictorial design, causing said rays to waver by intermittently cutting off part of the source of said rays, casting a shadow similarly caused to waver on said field, casting other constantly progressing shadows on said field and causing said contours, rays, wavering shadows and progressing shadows to present a unitary effect.

23. A method of simulating motion on a translucent field comprising, condensing certain light rays and dispersing certain other light rays from a relatively extended light source onto said field in a pictorial design and causing the ends of said rays to waver on said field by intermittently cutting off the rays from a part of said source.

24. A method of simulating motion on a translucent field comprising, condensing certain light rays and dispersing other light rays from a relatively extended light source onto said field, causing said rays to waver by intermittently cutting off the rays from a part of said source, casting a shadow similarly caused to waver on said field, and casting other constantly progressing shadows on said field.

25. In apparatus of the character described, the combination comprising a translucent field, and means for condensing certain light rays and scattering certain other light rays onto said field in a predetermined pictorial design, said means being spaced a distance behind said field, and said condensing and scattering means being provided with surface irregularities which form a pictorial design.

In testimony whereof I affix my signature.

HARRY M. LAXER.

CERTIFICATE OF CORRECTION.

Patent No. 1,888,861.　　　　　　　　　　　　　　November 22, 1932.

HARRY M. LAXER.

It is hereby certified that error appears in the printed specification of the above numbered patent requiring correction as follows: Page 3, line 130, claim 10, and page 4, lines 15, 33, 51, and 70, claims 11, 12, 13, and 14, after "upon" insert the word "and"; and that the said Letters Patent should be read with these corrections therein that the same may conform to the record of the case in the Patent Office.

Signed and sealed this 11th day of April, A. D. 1933.

(Seal)

M. J. Moore.
Acting Commissioner of Patents.